March 27, 1934.  A. H. TRAGESER ET AL  1,952,955
WELDED JOINT AND METHOD OF PRODUCING THE SAME
Filed April 16, 1932
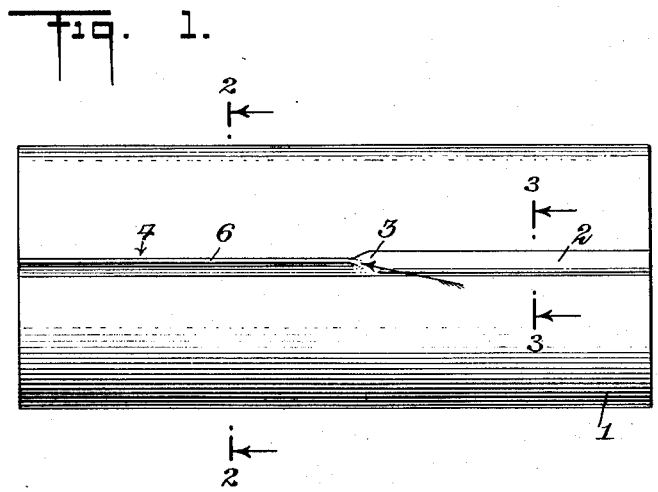
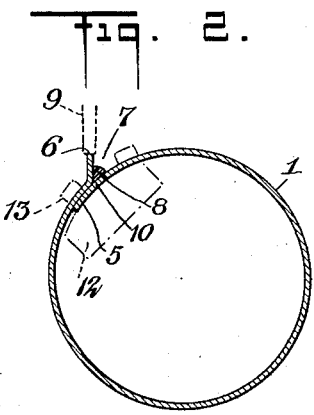
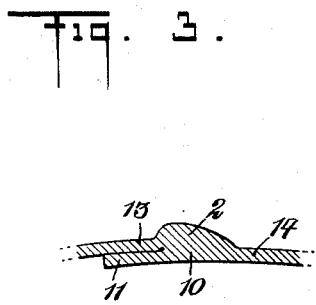
WITNESSES
INVENTORS
Albert H. Trageser
Louis Hassinger
BY Munn & Co.
ATTORNEYS Patented Mar. 27, 1934

1,952,955

UNITED STATES PATENT OFFICE 1,952,955

WELDED JOINT AND METHOD OF PRODUCING THE SAME

Albert H. Trageser and Louis Hassinger, New York, N. Y.

Application April 16, 1932, Serial No. 605,726

7 Claims. (Cl. 113—112)

This invention relates to welding joints or seams, and particularly, to welding longitudinal seams in boilers, or longitudinal seams in flat pieces, the object being to provide an improved method and finished product in respect to either extremely soft metals, as, for instance, copper or some composition of copper, or some rather hard and brittle substance, as, for instance, a Monel metal.

Another object of the invention is to provide an improved method wherein copper, or other soft sheet material, may be welded along longitudinal seams whether the metal is in the form of a boiler or whether it is flat, the method of permitting an automatic machine to apply the heat in a regular order during the welding operation.

A further object, more specifically, is to provide an improved method of welding the longitudinal seams of copper boilers wherein spelter is utilized and the parts are so held during the welding operation that a web of the material being welded is melted or burned down while the spelter is functioning, whereby the spelter, burned down web and adjoining portions of the boiler emerge into a homogeneous mass forming a ridge on the side where the heat is applied.

A further object is to provide a finished product comprising a body or a boiler formed with longitudinal seams with the welded joints having over-lapping parts of the material merging together and merging with a quantity of spelter.

In the accompanying drawing,—

Figure 1 is a top plan view of the body of a boiler with the longitudinal seam partly welded.

Figure 2 is a sectional view through Figure 1 on line 2—2.

Figure 3 is an enlarged detail fragmentary sectional view through Figure 1 on line 3—3.

Referring to the accompanying drawing by numerals, 1 indicates a tube which may be the body of a domestic boiler or other boiler, or may be used as a tube for various purposes. The tube 1 is shown as formed from copper, and the portion 2 illustrates the welded seam down to the welding torch 3, while the portion 4 is the unwelded part of the joint. Heretofore, it has been impossible to effect a structurally strong, longitudinal welded seam through the action of an automatic welding instrument on plain copper. The same, for other reasons, has also been true in a hard composition of copper, as, for instance, Monel metal, which usually consists of nickel 67%, copper 28% and iron and silicon 5%. Monel metal can be welded by gas, by hand, and is satisfactory for some class of work such as sinks and soda-fountains. The present invention refers more particularly to the method of welding copper, Everdur, or Monel metal sheets for use as pressure vessels. Heretofore, there has been no method whereby copper, Monel metal, or other metals having a high copper content, can be rapidly and automatically welded while in the shell or tubular formation suitable for high pressure work. Consequently, up to the present invention, Monel metal could not be welded, but by the process set forth herein it may be welded, either longitudinally, or any other direction. Also, copper and other soft metals may be welded by the present method which is disclosed structurally as far as possible in the accompanying drawing.

In Figure 2, it will be seen that the material of the tube 1 is overlapped slightly at 5 and that an upstanding web or flange 6 is provided which extends vertically in respect to the earth, though it is approximately at a 45° angle from the axis of the boiler. This provides a trough 7 in which the spelter 8 may be placed. Copper has a peculiar characteristic of quickly radiating heat, and, consequently, if the torch, indicated by the dotted lines 9, was placed against part of the boiler 1 at some other place than indicated in Figure 2, the heat would merely be radiated and the torch would not burn or melt the metal even though the same is thin, as, for instance, a sixteenth of an inch thick. In view of this characteristic, it has been impossible to provide a longitudinal seam with welding but by arranging the parts as shown in Figure 2, the flange or web 6 has only the upper edge subjected to the intense heat from the automatic welding torch 9, and, consequently, will melt at the upper edge, and as the torch is automatically actuated, it will gradually melt down the entire flange and the heat from the torch and the molten metal of the flange will melt the spelter 8. By the time the flange 6 has been melted down, the part at point 10 will also be in substantially a molten condition, and, consequently, the metal from the flange 6 and the spelter 8 will mix and intermingle and will penetrate more or less the metal at point 10, so that a homogeneous mass is produced with the molten metal forming a ridge exteriorly of the boiler. This is shown particularly in Figure 3 where the finished ridge 2 is disclosed, the overlapped portion 11 being unwelded, but the portion 10 merging into web 6, which web is formed from material of flange 6 and the spelter 8. In the case of Monel metal, the mixture is very homogeneous and the resultant welded seam 2 is usually brighter or lighter in color than the body of the metal being welded. It will be understood that during the welding operation, the water-cooled support 12 is positioned interiorly, while a suitable clamp 13 is positioned exteriorly, said clamp pressing the parts against the support 12. When a seam is to be welded, the automatic torch 9 is started at one end, and the corner at the end is first burned down or melted, and the remaining part of the torch being so set as to follow the flange 6 and burn the same down at a certain prescribed speed which is in proportion to the amount of current used. Usually, the temperature at the end of the torch is around 7,000° F., and, consequently, the speed of travel of the torch is rather fast, so that as soon as the metal and the spelter have fairly melted, the torch will move so that the molten material will not vaporize but will remain molten for a second or part of a second and will then begin to solidify. Where the temperature remains the same, the speed of the welding torch must be varied when different thicknesses of metal are being welded. When welding a tube, as shown in Figure 2, the parts are arranged as shown in the drawing. When welding a seam on a piece of flat material, the flat material is arranged at about a 45° angle from the horizontal, so that the flange 6 will be vertical. The welding operation is then carried on in the same manner. As soon as the welding operation has been completed, the joint will appear as shown at the right in Figure 1, and shown in cross section in Figure 3. It will be noted that the joint 2 is a ridge merging integrally into the over-lapping portions 13 and 14 of the material and that the raised portion is exteriorly of the tube or on the side which had the flange 6. As the spelter and the material of the overlapping parts merge together with the molten material from flange 6, a homogeneous mass is produced which really is an integral structure, integral both with the portions 13 and 14, thus providing a perfect water and gas tight seam, as well as a structurally strong seam.

It is to be understood that all copper shells today which are brazed use what is commonly known as old-fashioned dove-tail brazed joint which is the same method that has been used ever since copper-smithing was an art. In forming Monel metal shells, the same is generally true, and the seams thus produced are the results of laborious and expensive methods and are accepted methods of today. This is all hand work, but by the present invention, the same and better results can be secured automatically.

We claim:—

1. A method of welding longitudinal seams on boilers including overlapping the edges of the boiler, forming a flange on one of said overlapped edges, tilting the boiler until said flange is substantially vertical, applying spelter in the notch between the flange and the remaining part of the boiler, and then burning down the flange, said burning down operation starting at one end of the seam and moving toward the other end, the center of the heat being sufficient to melt the flange, the spelter and some of the adjacent material sufficiently to cause them to form into a homogeneous mass.

2. A method of welding longitudinal seams in tubular members formed of copper and of compositions having a high copper content, including the positioning of material with the edges in overlapped relation and one edge bent to present an upstanding flange, the arrangement of the flange and overlapping edges being such that the flange will be substantially vertical, supplying spelter adjacent the flange, and then subjecting the flange, spelter and surrounding material to sufficient heat to cause them to melt and flow into a homogeneous mass.

3. A method of welding longitudinal seams in sheet material comprising the positioning of the material with the edges in overlapped position, bending one of the overlapped edges into a flange, supplying spelter to a position adjacent the base of the flange and then burning down the flange, the heat from the flange being sufficient to melt the spelter and cause the spelter to merge with the surrounding overlapped part of the sheet material and with the molten material from the flange.

4. A method of welding seams on sheet metal formed of copper, Monel metal, and the like consisting in positioning the edges of the metal in slightly overlapped relation, bending one of said edges to form a flange, clamping said edges tightly together, supplying spelter to the base of said flange and then applying heat to the flange, spelter and surrounding parts until the flange, and part of the surrounding parts including the spelter are melted, the molten condition being maintained until the molten material merges into a substantially homogeneous mass.

5. A method of welding longitudinal seams in copper sheet metal and the sheet metal having a high copper content, comprising an arrangement of the edges of the material in overlapped relation, one of the edges being bent to present a flange arranged at an angle to the remaining part of the material, supplying a spelter at the juncture of the angle and the remaining material and then applying heat to the edge of the flange until the flange has been melted.

6. A method of welding tubular members of copper and sheet metal of a high copper content, consisting in forming sheet metal into a tube with the edges overlapped, one of the edges being bent to form a flange, arranging the tube so that the flange will be substantially vertical, positioning spelter in the notch at the base of the flange between the flange and the part to be welded thereto, and then applying heat to the edge of the flange so that the flange will be melted down, the flange being positioned substantially vertical so that the molten material therefrom will flow on to the spelter.

7. A tubular member formed of sheet copper or material having a high copper content comprising a body and a longitudinal welded seam, the material of the seam being arranged wholly exteriorly of the tubular member and merging integrally into the respective adjacent edges of the sheet material forming the tubular member.

ALBERT H. TRAGESER.
LOUIS HASSINGER.